(12) United States Patent
Smith et al.

(10) Patent No.: US 8,527,945 B2
(45) Date of Patent: Sep. 3, 2013

(54) METHOD AND SYSTEM FOR INTEGRATING MULTIPLE SCRIPTS

(75) Inventors: David D. Smith, Arlington, VA (US); John Colosi, Dulles, VA (US)

(73) Assignee: Verisign, Inc., Reston, VA (US)

( * ) Notice: Subject to any disclaimer, the term of this patent is extended or adjusted under 35 U.S.C. 154(b) by 622 days.

(21) Appl. No.: 12/776,310

(22) Filed: May 7, 2010

(65) Prior Publication Data

US 2010/0287532 A1 Nov. 11, 2010

Related U.S. Application Data

(60) Provisional application No. 61/176,372, filed on May 7, 2009.

(51) Int. Cl.
*G06F 9/44* (2006.01)

(52) U.S. Cl.
USPC .......................................... 717/110; 717/168

(58) Field of Classification Search
None
See application file for complete search history.

(56) References Cited

U.S. PATENT DOCUMENTS

| | | | |
|---|---|---|---|
| 6,317,871 B1 * | 11/2001 | Andrews et al. | 717/137 |
| 7,280,999 B2 | 10/2007 | Chung et al. | |
| 7,310,686 B2 | 12/2007 | Uysal | |
| 7,546,368 B2 | 6/2009 | Drees et al. | |
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,814,202 B2 | 10/2010 | Drees et al. | |
| 7,925,747 B2 | 4/2011 | Kirwan et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2003/0126559 A1 * | 7/2003 | Fuhrmann | 715/513 |
| 2004/0003113 A1 * | 1/2004 | Keohane et al. | 709/245 |
| 2004/0039798 A1 | 2/2004 | Hotz et al. | |
| 2004/0254926 A1 | 12/2004 | Balogh | |
| 2005/0027882 A1 | 2/2005 | Sullivan et al. | |
| 2005/0105513 A1 | 5/2005 | Sullivan et al. | |
| 2006/0004887 A1 * | 1/2006 | Schenk | 707/204 |
| 2007/0070820 A1 | 3/2007 | Gallant | |
| 2007/0100808 A1 | 5/2007 | Balogh | |
| 2007/0294419 A1 | 12/2007 | Ulevitch | |
| 2008/0059152 A1 | 3/2008 | Fridman et al. | |
| 2008/0071909 A1 | 3/2008 | Young et al. | |
| 2008/0133729 A1 | 6/2008 | Fridman et al. | |
| 2008/0155254 A1 | 6/2008 | Stradling | |
| 2008/0201413 A1 | 8/2008 | Sullivan et al. | |
| 2009/0106211 A1 | 4/2009 | Balogh | |
| 2009/0106390 A1 | 4/2009 | Kirwan, Jr. et al. | |
| 2009/0157889 A1 | 6/2009 | Treuhaft | |
| 2009/0235359 A1 | 9/2009 | Abdulhayoglu et al. | |
| 2009/0282027 A1 | 11/2009 | Subotin et al. | |
| 2009/0282028 A1 | 11/2009 | Subotin et al. | |
| 2009/0282038 A1 | 11/2009 | Subotin et al. | |
| 2010/0030897 A1 | 2/2010 | Stradling | |
| 2010/0036959 A1 * | 2/2010 | Trace et al. | 709/228 |
| 2010/0077462 A1 | 3/2010 | Joffe et al. | |
| 2010/0088671 A1 * | 4/2010 | Rentsch et al. | 717/108 |
| 2010/0138559 A1 | 6/2010 | Sullivan et al. | |
| 2010/0218040 A1 | 8/2010 | Bodmer et al. | |
| 2010/0257266 A1 | 10/2010 | Holmes et al. | |
| 2010/0274836 A1 | 10/2010 | Orentas et al. | |
| 2010/0274970 A1 | 10/2010 | Treuhaft et al. | |
| 2010/0287532 A1 | 11/2010 | Smith et al. | |
| 2010/0318858 A1 | 12/2010 | Essawi et al. | |
| 2011/0022678 A1 | 1/2011 | Smith et al. | |
| 2011/0029662 A1 | 2/2011 | Drees et al. | |
| 2011/0035469 A1 | 2/2011 | Smith et al. | |
| 2011/0035497 A1 | 2/2011 | Daly et al. | |
| 2011/0047292 A1 | 2/2011 | Gould et al. | |
| 2011/0051728 A1 | 3/2011 | Bhogavilli et al. | |
| 2011/0106891 A1 | 5/2011 | Gallant et al. | |
| 2011/0110267 A1 | 5/2011 | Gallant | |
| 2011/0161289 A1 | 6/2011 | Pei et al. | |

* cited by examiner

*Primary Examiner* — Elias Mamo

(74) *Attorney, Agent, or Firm* — MH2 Technology Law Group, LLP

(57) ABSTRACT

A method of testing the server implementation of the Domain Name System protocol by using a first body of computer code in a first programming language capable of sending and receiving DNS requests, and a second body of computer readable code in a second programming language capable of generating DNS requests and verifying responses. The second programming language may be tailored to writing code being capable of generating Domain Name System requests and verifying the response thereby allowing the program to be efficiently reconfigured to test different aspects of the server.

13 Claims, No Drawings

METHOD AND SYSTEM FOR INTEGRATING MULTIPLE SCRIPTS

BACKGROUND OF THE INVENTION

Computer programs frequently communicate over a network using a specific protocol. When implementing such communications protocols it is important to verify that the implementation is correct, and that the program communicates correctly. A server program is often implemented to respond to specific queries over the network according to such a protocol. When testing the implementation of a server program, testing will often comprise sending the server a number of requests, and then verifying that the answer sent by the server is correct.

It is often convenient to write a custom program to send these requests and verify the answers as a significant volume and variety of requests must be sent to properly test the server software with respect to a great number of different requests, and to test how the implementation performs under heavy loads.

When writing such programs using a conventional programming language such as Java or C++, the resulting programs can often be very repetitive, as the code generating the different requests may be repeated a great number of times with small variations. Furthermore, the code can be very difficult to read and very long, as the code needed to generate and verify the requests can require long functional statements in these languages.

BRIEF SUMMARY OF THE INVENTION

Embodiments of the present invention include a method for using domain-specific languages to make the writing and modifying of the code used to test the implementation of a server platform or other program more efficient.

An embodiment of a program used to test the server software may consist of a piece of base code, possibly may be written in Java, which is able to communicate with the server software, and in particular, send requests to the server, and receive responses to those requests. The embodiment may further contain a second body of code written in a domain-specific language that is tailored to the particular network protocol implemented by the server, for example the protocol used to send requests to resolve domain names over the Domain Name System (DNS).

This second body of code may implement functionality to generate requests conforming to a particular network protocol, such as requests to resolve DNS names, and to verify that the responses sent to those requests are correct, or any other suitable functionality.

DETAILED DESCRIPTION OF THE INVENTION

Embodiments of the present invention provide a method for testing the implementation of network communications protocols by creating a computer program to send requests to a server and verifying that the responses sent back conform to the protocol. This program may comprise one or more pieces of code written in one or more domain-specific scripting languages.

These pieces of code may be nested such that there is a top level piece of code, and that one or more subordinate pieces of code are invoked from this piece of code. These subordinate pieces of code may in turn have subordinate pieces of code to which they are superior.

The subordinate pieces of code may communicate with the superior piece of code via a scripting interface such as the one defined in Scripting for the Java Platform (JSR-223) standard. This interface may allow the two pieces of code to share variables, functions and objects, such that the subordinate piece of code may be able to access objects and functions in the superior piece of code and that the superior piece of code may be able to access objects and functions in the subordinate piece of code.

The different pieces of code may be combined into a single file or code. In this file, textual indicators may be used to indicate the start and end of each piece of code, and the relationship between different pieces of code. In another embodiment of the invention, the different pieces of code are held in separate files. The different files may be referenced from each other. In an embodiment of the invention, one piece of code can dynamically load a piece of code as subordinate code while executing.

In the JSR-223 implementation, each piece of subordinate code in assigned to a script-engine in the superior code. The script engine is a programmatic object which implements certain functions, including a function to execute a string of script-code. The script engine is responsible for maintaining the context of the script, and for channeling function calls between the superior and subordinate code. Furthermore, the script engine translates function arguments and results when functions in a superior piece of code are called from a subordinate piece of code and when functions in a subordinate piece of code are called from a superior piece of code. A script engine in the JSR-223 standard may be created by the script engine generator class. Each scripting language used under the JSR-223 standard may have its own script engine generator. Upon detecting a section of subordinate code, the superior code may cause a script engine to be created using a script engine generator, and then invoke the script using the script engine. Depending on the number of subordinate programming languages used, the superior code may use various methods to detect which script engine generator to use. In an embodiment of the invention, the subordinate code is encapsulated in a statement indicating which programming language it is written in.

In an embodiment of the invention one of the programming languages is executed using just-in-time compilation. In another embodiment of the invention one of the programming languages is executed by interpreting the statements segment by segment or line by line. In this case, different segments of the same script may be interspersed throughout its superior code.

When nesting code in multiple levels, an intermediate language may use its own scripting interface to invoke the subordinate code. In another embodiment of the invention, an intermediate language will use the scripting interface between itself and its superior code to create a scripting engine object for the subordinate code, and use that scripting engine through the scripting interface to the superior code to invoke the subordinate code. When code is nested in more than three levels it is possible to create scripting engines at the top level for every piece of code detected.

In an embodiment of the invention, one piece of code implements functions to send a request to resolve a domain name in the Domain Name System (DNS) to a server, and functionality to receive responses to such requests. The function that sends requests to the server may take as input an object that contains certain parameters for the request, such as the domain name to be resolved, whether the query should be recursive and the types of records to return, such as A, NS and SOA record types, etc. In an embodiment of the invention, these parameters can include the address of the server to which to send the requests. The function may then prepare a DNS request based on these parameters, and send them to the server. When a response to the request is received, the functionality implemented to receive the request may receive the data from the server, and parse the response into the different parameters of the response, and create an object that contains these parameters and pass it to a subordinate piece of code, which may then verify that the response is correct.

For example, java code to create an object representing a DNS request for the A records associated with the domain "www.verisign.com" to the DNS server at the IP address "1.1.1.1" may be done with the following code:

```
DNSRequest req = new DNSRequest( ).
req.setDomain("www.verisign.com");
req.setDNSServer("1.1.1.1");
req.setRecordTypes("A");
req.Dispatch( );
```

With a domain-specific language, the same can be achieved with the following code:

```
N: www.verisign.com
S: 1.1.1.1
R: A
DISPATCH
```

A second piece of code may implement functions to generate requests to resolve domain names and to pass these requests on to the first piece of code such that these requests are sent to the server. The requests may be generated as sets of parameters that are passed to a function in the first piece of code. In an embodiment of the invention the request is passed to the function as an object containing the set of parameters relating to the request.

The second piece of code may also implement functions to verify a response that is received. This may be a function implemented in the second piece of code which may be called with a parameter containing an object with the parameters of the response received from the server that returns a value of TRUE for responses that are accepted and FALSE for responses that are rejected.

In an embodiment of the invention, the second piece of code is in a domain-specific scripting language. A domain-specific scripting language may be tailored to a particular class of problems or programs. A domain-specific language may be tailored to a number of different types of programs and problems. Some domain-specific languages are heavily tailored to very specific tasks. Such highly specialized languages will be very efficient for the tasks which they have been designed for, but may be extremely impractical or unusable in respect of other tasks. For instance, a language may be tailored just to expressing and sending requests to resolve DNS names, and specifying certain criteria for the response. The language may define a syntax for expressing DNS queries, and may define certain criteria for the responses. This language may however not contain any means for opening a connection to a DNS server and actually transmitting the request, or may require very comprehensive code to achieve this. Many highly specialized domain-specific languages can significantly reduce the amount of code needed when used for the targeted domain, and the efficiency gain is often related to the amount of specialization of the language. There may therefore be a need to use a greater number of languages where highly specialized domain-specific languages are used.

In one embodiment of the invention, an application to communicate with a DNS server contains code written in Java and code written in a domain-specific language that is specialized for describing requests to resolve domain names in the DNS and specifying criteria for the responses. The request may be expressed using dedicated keywords for each parameter a request may contain. For example, the statement "N:verisign.com" may declare that the domain name to be resolved is "verisign.com". Furthermore, the statement "R:A" may declare that the subject of the request is the set of the records associated with verisign.com of type "A". Similarly, the language may contain keywords for each parameter that a response may include. For example the statement "R:A: 69.58.181.89" may specify that at least one of the A-records of the response should contain the IP address "69.58.191.89". The language may also declare a keyword for dispatching the request such as "DISPATCH". This statement may cause a function in the Java part of the application to be called for the request specified. This function can then send a request to the DNS server and verify whether the response conforms to the criteria specified.

In an embodiment of the invention, an application is used to verify the implementation of a server program responding requests to resolve domain names in the DNS that implements the DNSSEC standard. In this case, a domain-specific language, as described above, may be used to verify the response to the DNS query, and a second domain-specific language may be used to describe the requirements of the signature of the response to the query. The first domain specific language may include a keyword triggering the invocation of the second language. For example, the statement "SIGN:xSec(KEY: 123456)" may cause the statement "KEY:123456" to be executed in the second, DNSSEC specific, language. The second language may be able to verify whether the key used to sign the response was the key "123456".

In a different embodiment of the invention, the subordinate piece of code contains syntax to specify parameters for the domain-name request, but does not specify parameters for the response. Instead, the subordinate code contains a function that takes a set of request parameters and a set of response parameters and returns TRUE or FALSE depending on whether the response is appropriate for the request. In an embodiment of the invention, a further subordinate language may be used for certain parts of this function where code that is not specific to DNS queries is used.

Other embodiments of the invention may be used to test implementations of network protocols that use a simple request and response implementation, such as Hyper Text Transfer Protocol (HTTP), Registry Registrar Protocol (RRP) and Dynamic Host Configuration Protocol (DHCP).

Embodiments of the invention can also be used to test more complex protocols, including protocols where the client, the server or both are required to maintain a state, such as the Session Initiation Protocol (SIP). In such cases, an object containing the parameters of the state may be passed between the different pieces of code via an interface as described above. In an embodiment of the invention, a separate scripting language is used to maintain the state of the connection.

An embodiment of the invention may also be used to verify implementations of a network protocol in a client program for many of the same protocols. The invention may be used to verify that DNS and HTTP requests received from a client are correctly formatted. As when verifying server implementations, the invention may be used to test implementations of network protocols in a client program. For example, the invention may be used to test the implementation of a SIP client implementation in an Internet Protocol telephone.

In some cases, the use of the invention may go beyond testing of an implementation of a network protocol. For example, the invention may be used to detect uptime by verifying that a server is providing correct responses at an interval.

The invention may also be used to make server or client implementations of certain network protocols. For example, a domain-specific programming language may be used to generate responses to DNS queries received at a server based on the requests received. In an embodiment of the invention, a DNS server is constructed in the Java programming language. The Java implementation is capable of receiving DNS queries and extracting the parameters of the query and generating a java object containing them. Similarly, it is able to send a response to a query based on a Java object containing the parameters of the response. The Java portion of the server could also implement features such as load balancing and redundancy. The portion of the server in the domain-specific language may be responsible for processing the query and determining the parameters of the response. This may include communicating with a database to determine certain parameters of the response.

Embodiments of the invention may also be useful in contexts outside the implementation of network protocols. For example, nested domain-specific languages may be useful in communications protocols inside a particular computer, or for communications within an application.

Embodiments of the invention also include programs that contain a number of specialized modules that are prone to be reconfigured or re-written more frequently than other parts. This may be used in a number of data-driven applications where a domain-specific language can be used to process data. In an embodiment of the invention, a domain-specific language is used to verify data entered on a website. This domain specific language may in turn rely on another domain specific language to look up certain parts of the entered data in a database. For example, a website may use a data driven language to verify that information entered on a form conforms to the formal requirements by checking that postal codes are five digits long, and that social security numbers are nine digits long. This language may invoke code in another language to verify that the social security number and the name entered match, and that the street address and the postal code match.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer-implemented method of testing the server-side implementation of the Domain Name System protocol comprising:
   receiving, by a computing system, a first body of computer-readable code in a first computer programming language, the first body configured to send Domain Name System requests and to receive responses to the Domain Name System requests;
   receiving, by the computing system, a second body of computer readable code in a computer programming language tailored to handle Domain Name System requests, the second body configured to generate the Domain Name System requests and to verify whether the response to a particular Domain Name System request is correct;
   combining, by the computing system, the first body of code and the second body of code, wherein the second body of code is able to access objects and functions in the first body of code, and the first body of code is able to access objects and functions in the second body of code; and
   executing the combined code at a computer, causing the computer to:
      send a number of Domain Name System requests to a server;
      receive responses to the Domain Name System requests; and
      verify that a response received for each Domain Name System request contains the correct data.

2. The method of claim 1 wherein the second body of computer readable code is executed by a JSR-223 compliant scripting engine.

3. The method of claim 1 wherein the first body of computer readable code is Java code.

4. The method of claim 1 wherein the second body of computer readable code is embedded within the first body of computer readable code.

5. The method of claim 1 wherein the first body of computer readable code is executed by a JSR-223 compliant scripting engine and the second body of computer readable code is executed by a JSR-223 compliant scripting engine.

6. A computer-implemented method of testing a server-side implementation of a network protocol comprising:
   receiving, by a computing system, a first body of computer-readable code in a first computer programming language, the first body configured to send requests over the network protocol, and to receive responses to the requests;
   receiving, by the computing system, a second body of computer-readable code in a second computer programming language, the second body configured to generate requests complying with the network protocol and to verify whether a response to a particular request is correct; and
   combining, by the computing system, the first body of code and the second body of code such that the second body of code in the second computer programming language is able to access objects and functions in the first body of code in the second computer programming language.

7. The method of claim 6 wherein the second body of computer readable code is executed by a JSR-223 compliant scripting engine.

8. The method of claim 6 wherein the first body of computer readable code is in a first domain-specific scripting language.

9. The method of claim 6 wherein the second body of computer readable code is in a second domain-specific scripting language.

10. The method of claim 9 wherein the second domain-specific scripting language is tailored to the particular network protocol.

11. The method of claim 8 wherein the first domain-specific scripting language is tailored to sending requests to resolve a domain name, and receiving responses to the requests.

12. The method of claim 10 wherein the second domain-specific scripting language is tailored to generating requests to resolve domain names and verifying that the response to the particular request is correct.

13. The method of claim 12 wherein the second domain-specific scripting language is capable of verifying that the response to a request to resolve a domain name is compliant with the Domain Name System Security (DNSSEC) protocol.

* * * * *